US008239802B2

(12) United States Patent
Liu et al.

(10) Patent No.: US 8,239,802 B2
(45) Date of Patent: Aug. 7, 2012

(54) ROBUST METHOD FOR INTEGRATION OF BUMP CELLS IN SEMICONDUCTOR DEVICE DESIGN

(75) Inventors: Hung-Yi Liu, Pingjhen (TW); Chung-Hsing Wang, Baoshan Townhship, Hsinchu County (TW); Agrawal Aditya Binodkumar, Bihar (IN)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 344 days.

(21) Appl. No.: 12/575,147

(22) Filed: Oct. 7, 2009

(65) Prior Publication Data
US 2011/0083115 A1 Apr. 7, 2011

(51) Int. Cl.
*G06F 17/50* (2006.01)
(52) U.S. Cl. ........................................ 716/118; 716/126
(58) Field of Classification Search .................. 716/118, 716/126
See application file for complete search history.

(56) References Cited

U.S. PATENT DOCUMENTS

| 6,581,200 B2 | 6/2003 | Chopra et al. |
| 7,490,310 B2 | 2/2009 | Koehl et al. |
| 2007/0234261 A1* | 10/2007 | Nakagawa ................ 716/11 |
| 2009/0193374 A1* | 7/2009 | Fujimoto et al. ............ 716/6 |
| 2011/0093235 A1* | 4/2011 | Oh et al. ................ 702/120 |

* cited by examiner

*Primary Examiner* — Stacy Whitmore
*Assistant Examiner* — Magid Dimyan
(74) *Attorney, Agent, or Firm* — Duane Morris LLP

(57) ABSTRACT

A system and method for computer-aided design of semiconductor integrated circuit devices provides for having dummy vias beneath UBM of bump cells to prevent delamination at the bump cell sites during bonding. The dummy vias are inserted into the design and bump cell placement occurs during the floorplanning stage and prior to placement and routing of the active integrated circuit components. In this manner, a sufficiently high via density is achieved and design information on the bump cells including the dummy vias is provided to a computer-aided design, CAD, system along with program instructions for carrying out the indicated sequence of design operations.

23 Claims, 5 Drawing Sheets

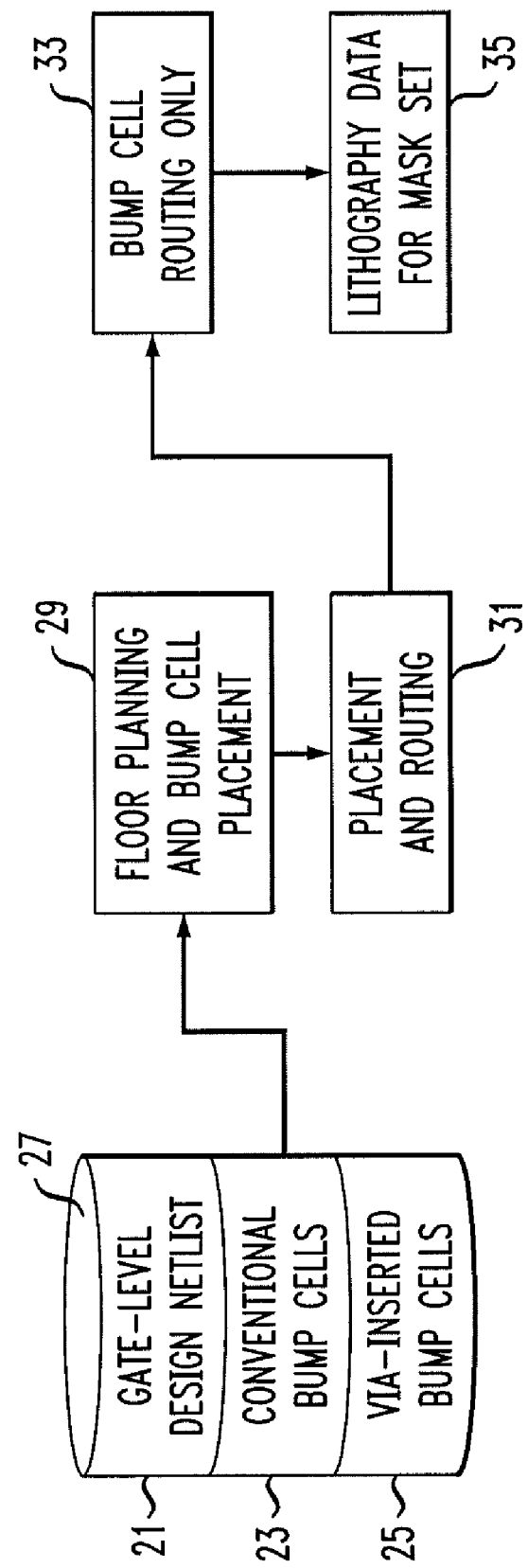

ROBUST METHOD FOR INTEGRATION OF BUMP CELLS IN SEMICONDUCTOR DEVICE DESIGN

FIELD OF THE INVENTION

The present invention generally relates to electronic circuits, more particularly to the design of semiconductor devices such as integrated circuits. More particularly, the present invention relates to computer-aided design (CAD) systems used to design semiconductor devices by generating lithography data to form a mask set and to methods and systems for effectively integrating bump cells with dummy vias into semiconductor device design to provide suitably high via density in the bump cells.

BACKGROUND

Integrated circuits are designed using computer-aided design (CAD) tools that generate lithography data used to form a mask set. The mask set is used in the fabrication of the integrated circuit (ic) devices.

The integrated circuit design process includes constructing the integrated circuit design out of simple circuits (standard cells) that are connected together electrically using wire interconnects. The standard cells and connections between them are stored in databases called "netlists" (i.e., lists of symbolic interconnections).

The netlist may include information describing inputs, outputs, transistors and a multitude of other electronic components, as well as the interconnectivity of the inputs, outputs, transistors and multitude of other electronic components.

As part of the computer implemented design process, the design information within a netlist is "placed and routed" by the CAD tool. The CAD tool utilizes placing and routing processes that are typically software programs executed on the CAD tool (often called placers and routers). The placer determines the optimum location of each standard cell within the integrated circuit layout on the semiconductor substrate. The placement location is optimized to reduce the distance between standard cells that are electrically connected to each other by wire interconnects such as input/output lines. This is done to minimize the area of the semiconductor substrate consumed by the integrated circuit and is also done to minimize the lengths of wire interconnects to reduce net capacitance within the design. The router optimizes the routing of input/output lines between connected standard cells so that the integrated circuit layout does not become overly congested by input/output lines.

A floorplan of an integrated circuit is a schematic representation of the tentative placement of its major functional blocks. For example, the metal bond pads of bump cells for contacting external components (often using wire bonding) are often located at the circumference of the chip of the integrated circuit. In modern electronic design processes, floorplans are created during the floorplanning design stage, an early stage in the hierarchical approach to chip design, i.e. before the placing and routing.

For advanced packaging, integrated circuits and other semiconductor devices are assembled using a lead-free bumping process that couples the bond pads of the bump cells of the semiconductor device, to external components. The advent of the lead-free bumping process, however, has created the problem of delamination of device features beneath the bond pads and within the bump cells. Delamination can occur for various components at any of various levels beneath the under bump metallization (UBM) and under the metal bond pads of the bump cells.

To address this delamination problem, various techniques have been attempted such as adding dummy vias and dummy metal beneath the UBM, and therefore beneath the bonding pad, in a bump cell. These techniques attempt to add dummy vias in the bump cells during the computer-aided design process. Such attempts to add dummy vias into bump cells during the design process conventionally involve inserting the dummy vias and dummy metal into the design after floorplanning, and after placement and routing of the active components of the device, has been executed. When dummy vias and dummy metal are added into the bump cells after floorplanning and placement and routing of the active device components, however, it is difficult to add enough via and metal structures to provide sufficient via density to avoid delamination, because of the wire congestion that already exists in the design by virtue of the placement and routing of the active integrated circuit components having already been completed.

According to one prior art example illustrated in FIG. 1, a gate-level design netlist of interconnected components of a semiconductor device is provided to a conventional CAD unit at step 3 and floorplanning of the semiconductor device is carried out, i.e., executed by the CAD unit, at step 5. At step 7, placement and routing of the semiconductor device is executed. During floorplanning and placement and routing, the computer aided design procedure attempts to provide the highest level of integration possible, integrating as many features as possible into a small area in order to minimize the semiconductor area required to build the integrated circuit or other semiconductor device, and to minimize the lengths of the wire interconnects. After floorplanning and placement and routing have taken place, instructions for the insertion of dummy via/dummy metal are provided to the CAD system at step 9. Information on conventional bump cells is provided at step 13. Placement and routing of the bump cells takes place at step 11. Since floorplanning and placement and routing of the semiconductor device have already occurred at steps 5, 7, wire congestion already exists and makes it difficult to add a sufficient number of dummy vias and dummy metal beneath the bond pads of the bump cells. The CAD process yields the lithography data used to form a mask set, at step 15, but this lithography data may be deficient in that the via density in the bump cells is insufficient to prevent delamination.

As such, according to conventional is design methods and procedures, sufficient via density cannot be attained in bump cells due to the foregoing and therefore the manufactured integrated circuit device is prone to delamination during the lead-free bumping process. The present invention addresses these shortcomings.

SUMMARY OF THE INVENTION

To address these and other needs, and in view of its purposes, the present invention provides, according to one aspect, a computer implemented method for semiconductor device manufacturing. The method comprises providing a mask manufacturing unit comprising a CAD unit configured to design mask patterns based on design data and to generate lithography data for a mask set used to produce a semiconductor device. The method further comprises providing to the CAD unit a) design information of interconnected components of the semiconductor device in a netlist and b) design information on bump cells that includes information on inserting dummy vias within at least some of the bump cells.

After providing the design information as indicated, the method provides for directing the CAD unit to perform floorplanning, placement and routing of the interconnected components, and placement and routing of the bump cells based on the design information on bump cells. The method further provides the CAD unit executing at least the floorplanning, the placement and routing of the bump cells including insertion of the dummy vias, and the placement and routing of the interconnected components wherein at least the placement of the bump cells and the insertion of the dummy vias is executed prior to the routing of the interconnected components of the device.

According to another aspect, provided is a computer implemented method for semiconductor device manufacturing, the method comprising providing a mask manufacturing unit comprising a CAD unit configured to design mask patterns based on design data and to generate lithography data for a mask set used to produce an integrated circuit (ic) device. The method includes providing to the CAD unit, a) design information of interconnected active ic components in a netlist and b) design information on bump cells that includes information on inserting dummy vias within at least some of the bump cells. The method further comprises directing the CAD unit to execute placement of the bump cells and insertion of the dummy vias along with the execution of floorplanning of the semiconductor device and also to execute routing of the bump cells along with execution of placement and routing of the interconnected ic components.

According to another aspect, a computer system is provided. The computer system is adapted to design a mask set for an integrated circuit device and comprises a memory device and program instruction stored on the memory device for executing placement of bump cells and insertion of dummy vias into the bump cells no later than routing of interconnected active components of the integrated circuit device.

According to another aspect, provided is a computer readable storage medium encoded with a computer program to be executed by a computer for designing an integrated circuit device. The computer readable storage medium comprises program instructions for carrying out execution of floorplanning, bump cell placement and routing, insertion of dummy vias and metal in bump cells, and placement and routing of interconnected active components of the integrated circuit device. The program instructions provide for executing bump cell placement and insertion of dummy vias in the bump cells no later than routing of interconnected active components of the integrated circuit device

BRIEF DESCRIPTION OF THE DRAWING

The present invention is best understood from the following detailed description when read in conjunction with the accompanying drawing. It is emphasized that, according to common practice, the various features of the drawing are not necessarily to scale. On the contrary, the dimensions of the various features are arbitrarily expanded or reduced for clarity. Like numerals denote like features throughout the specification and drawing.

FIG. 2 is a flowchart of an exemplary inventive method for inserting dummy vias in a computer-aided design process sequence for designing a mask set for a semiconductor device;

DETAILED DESCRIPTION

Figure 1:
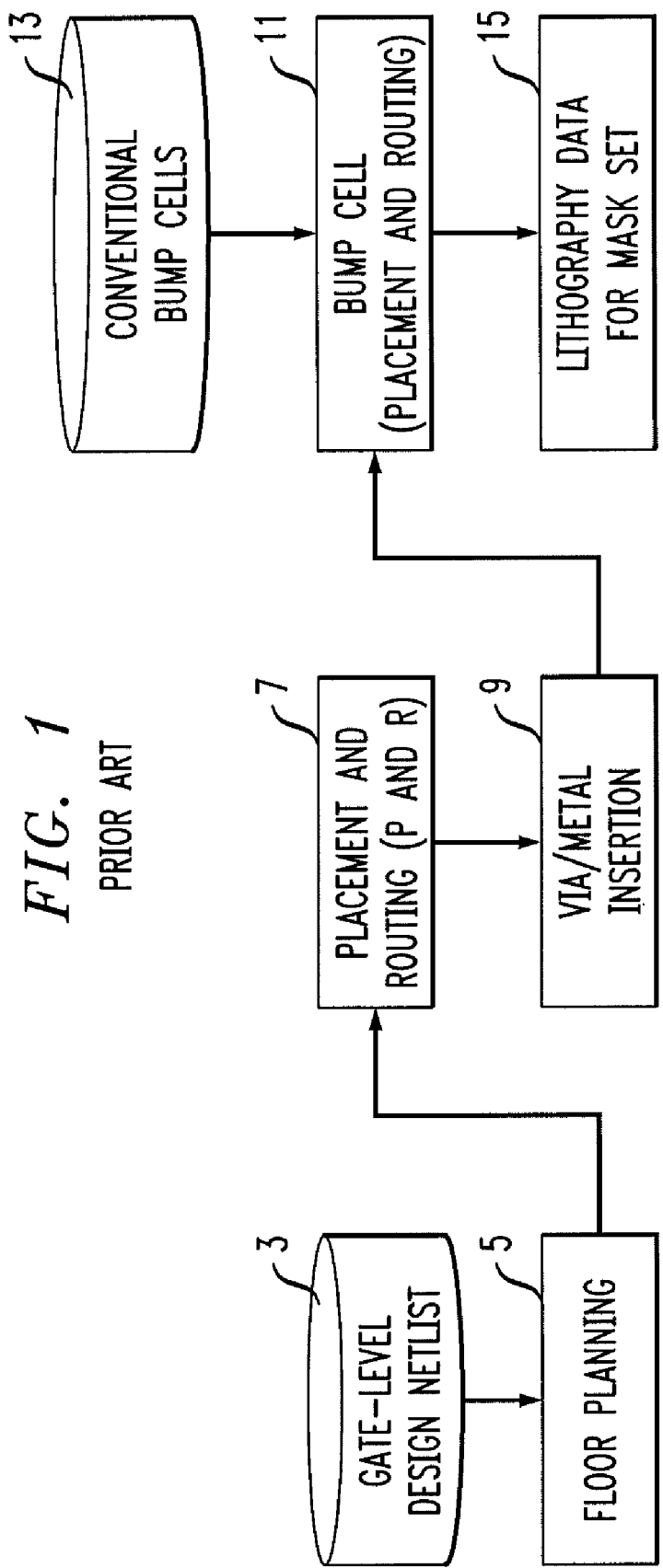
FIG. 1 is a flowchart, according to the PRIOR ART, of a conventional computer-aided design process sequence for designing a mask set for a semiconductor device.

The present invention provides a computer implemented method for semiconductor device design and semiconductor device mask manufacturing. The invention also provides a computer system for carrying out the method by executing design steps and providing lithography data, and also a computer program product that may be a computer-readable medium with program instructions on the computer-readable medium for carrying out the inventive method. Lithography data produced by the computer implemented design method is provided to a mask manufacturing tool and the mask manufacturing tool manufactures a corresponding mask set based on the lithography data. The mask set is then used to form an integrated circuit or other semiconductor device using conventional methods.

A mask manufacturing unit including a CAD (computer aided-design) tool is configured to design a mask set based on design data by generating lithography data used to manufacture the mask set. Design information is input to the CAD unit and program instructions are provided to the CAD unit to enable the CAD unit to design the mask set. The design information includes design information on a netlist of interconnected active components of the device and also information on bump cells that includes information on conventional bump cells and bump cells that include at least one of dummy vias and dummy metal inserted into the bump cells. The dummy vias and dummy metals may be inserted beneath the metal bond pad of the bump cell and may be disposed at any one or more of the various levels beneath the bond pad.

Program instructions are sent to the CAD unit to perform floorplanning of the integrated circuit device, placement and routing of the interconnected active components and placement and routing of all bump cells based on the netlist and the information on bump cells that was provided to the CAD unit. The CAD unit then executes floorplanning, and placement and routing of the interconnected components of the device and placement and routing of the bump cells. It is an aspect of the invention that the placement of the bump cells and the insertion of dummy vias and/or dummy metal into the bump cells may be executed during the floorplanning stage and may be executed at the same time or prior to placement and routing of the interconnected components of the device. In one embodiment, placement and routing of the bump cells and the insertion of dummy vias is executed at the same time or earlier than the placement and routing of the interconnected components of the device. In one advantageous embodiment, the placement of bump cells and the insertion of dummy vias and dummy metal into the bump cells is executed prior to routing of the interconnected components of the device. In another embodiment, the placement of bump cells and the insertion of dummy vias and dummy metal into the bump cells is executed prior to placement and routing of the interconnected components of the device.

According to another aspect, the invention provides a computer system that designs a mask set for an integrated circuit or other semiconductor device. Various CAD systems are available and may be used.

According to yet another aspect, the invention provides a computer-readable storage medium encoded with a computer program to be executed by a computer to design a semiconductor device. The program instructions on the computer-readable storage medium provide for carrying out the execution of floorplanning, bump cell placement and routing, insertion of dummy vias and metal in bump cells and placement and routing of interconnected components of the semiconductor device. The instructions provide for executing bump cell placement and insertion of dummy vias in the bump cells no later than routing of the interconnected active components of the integrated circuit device.

Now referring to FIG. 2, information is provided to the CAD system at step 27. Gate-level design netlist 21 is provided along with design information on conventional bump cells 23 and design information on via inserted bump cells 25, at step 27. The design information on via inserted bump cells 25 may also include design information on dummy metal inserted into the bump cells. At step 27, this data is input to the CAD tool which may be an APR (automatic place and route) tool according to one exemplary embodiment but various other suitable CAD tools may be used in other exemplary embodiments. The data may be input into a data receiving unit using conventional means and it may be temporarily stored on a memory device. The gate-level design netlist 21 may include design information on interconnected active components of a semiconductor device which may be an integrated circuit or other semiconductor device. The information on conventional bump cells 23 may include information on the bond pad over which a bump may be joined. The bump is used to couple the formed semiconductor device to other external components. A conventional bump cell may include one or several levels of under bump metallization, UBM, formed over the metal bond pad, as well as other features. Information on via inserted bump cells 25 may include information on bump cells that includes one or more dummy vias and dummy metal beneath the UBM of the bump cell and this information is advantageously provided before routing takes place at step 31.

According to one exemplary embodiment, the information on via inserted bump cells 25 may include a plurality of dummy vias that will be inserted beneath the metal bond pad in a bump cell during the CAD process. The design information on via inserted bump cells 25 may also include design information on dummy metal inserted into the bump cells. Each inserted via advantageously extends from an underlying metal structure to an overlying metal structure, either or both of which may be dummy metal features. As will be shown in FIG. 4A, a bump cell includes one or more layers of under bump metallization, UBM, formed between the metal bond pad and the solder bump.

Figure 3A:
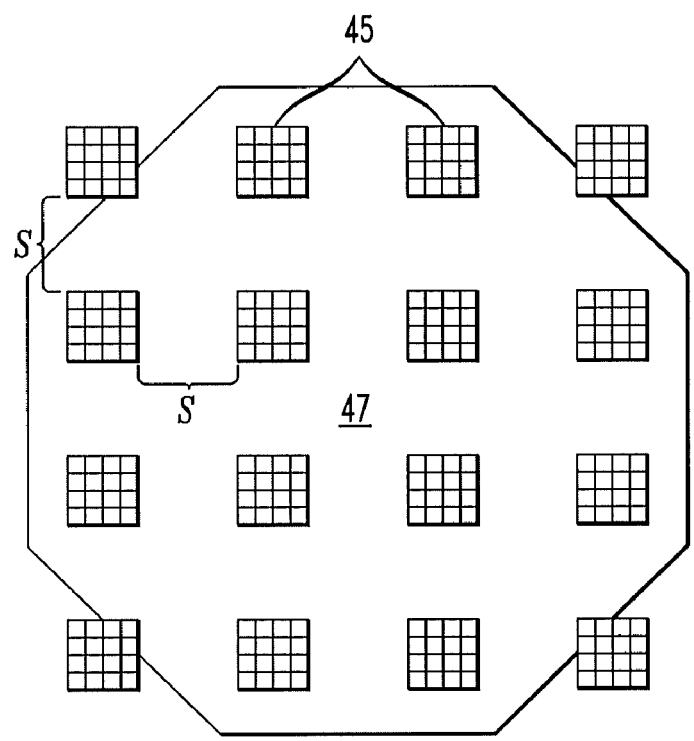
FIGS. 3A and 3B illustrate exemplary arrangements for dummy vias within bump cells.
Figure 3B:
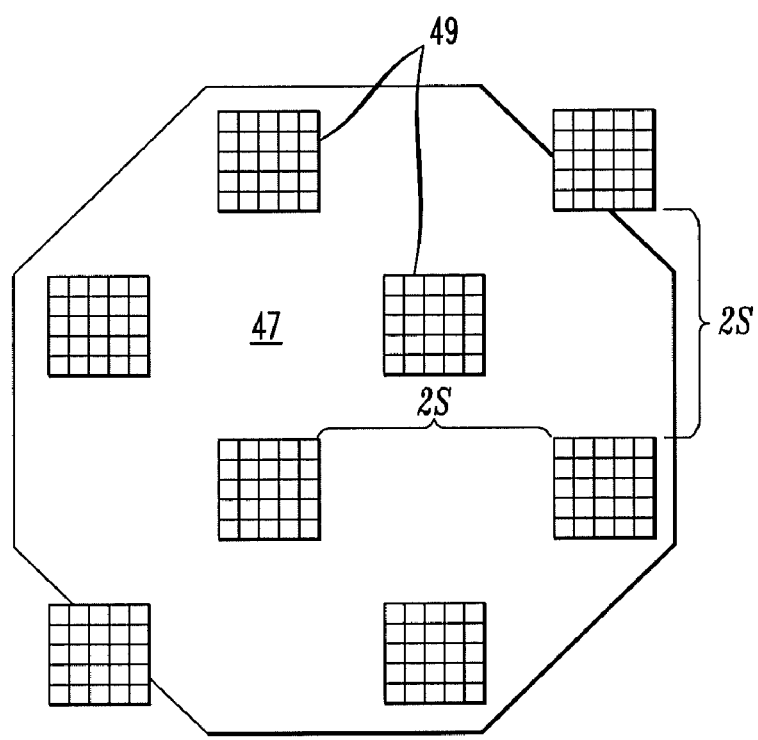

While dummy vias and dummy metal are disposed beneath the metal bond pad which is below the UBM, FIGS. 3A and 3B show exemplary arrangements of dummy via structures with respect to the UBM of the bump cell. According to one exemplary embodiment such as illustrated in FIG. 3A, the dummy vias may include a uniform array of via structures 45 beneath UBM 47, the via structures 45 each separated by a uniform spacing S. According to another exemplary embodiment such as illustrated in FIG. 3B, a plurality of via structures 49 may be spaced at a greater distance 2S and arranged in a staggered array beneath UBM 47. It should be noted that each of FIGS. 3A and 3B represent a schematic view with the via structures 45, 49 superimposed over UBM 47. In each case, the via structures 45, 49 are beneath UBM 47 and the corresponding metal bond pad and may be disposed in any one or more of several layers of dielectric layers beneath UBM 47 and in each case, the arrangement and spacing is intended to be exemplary only. Many semiconductor devices include ten or more layers of dielectric material through which interconnect features may extend and the dummy via structures 45, 49 may be disposed in any of these layers. According to one exemplary embodiment, via structures may be disposed in multiple layers. Via structures 45, 49 may be a single via or a plurality of vias such as an array of vias. As such, according to one exemplary embodiment, the structures 45, 49 shown in FIGS. 3A and 3B may each represent an array of vias, thereby forming an array of via arrays.

Figure 4A:
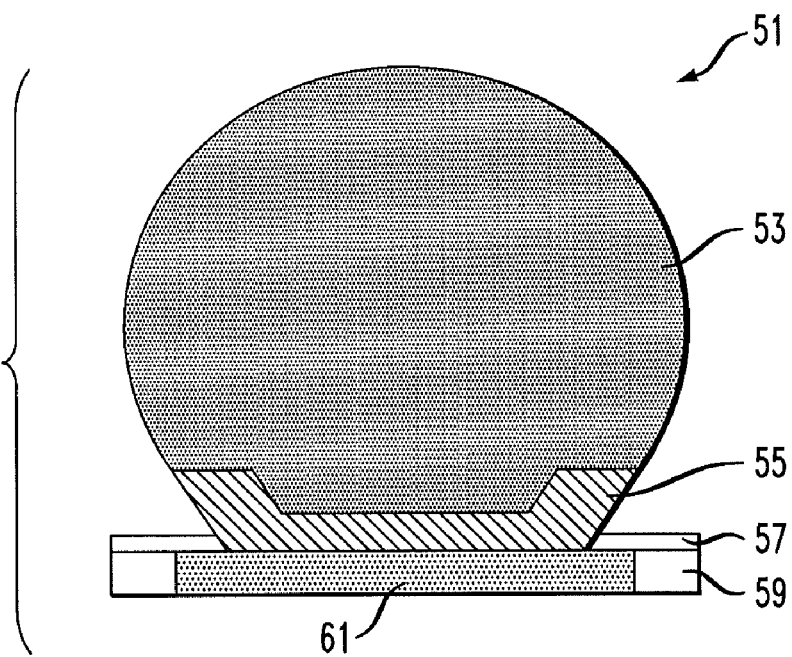
FIGS. 4A and 4B are cross-sectional views showing a bump including UBM and exemplary via structures, respectively.
Figure 4B:
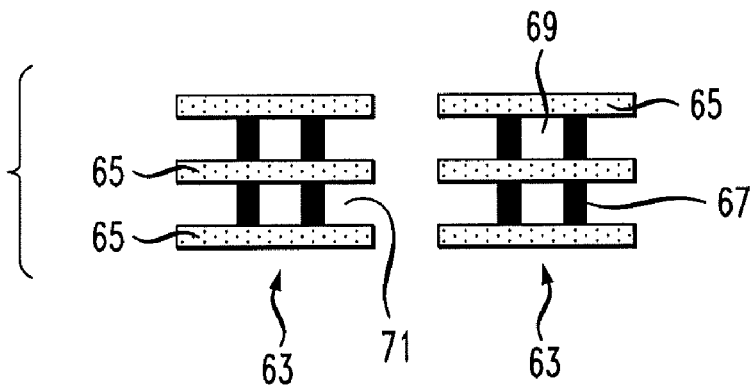

FIGS. 4A, 4B illustrate a conventional bump structure (FIG. 4A) and inserted dummy vias/metal (FIG. 4B). FIG. 4A is generally aligned over FIG. 4B to indicate that the dummy via and metal structures are generally aligned beneath the bump structure but the features are not to scale and relative positions and sizes of the features of FIGS. 4A, 4B are also not necessarily to scale. It should be noted that the dummy vias may be disposed at various depths beneath the bump structure. Bump structure 51 in FIG. 4A includes bump 53, under bump metallization, UBM 55, passivation layers 57, 59 and metal bond pad 61. Such is intended to be exemplary only. Bump 53 may advantageously be a lead-free solder, but other materials may be used in other exemplary embodiments. Now referring to FIG. 4B, disposed beneath bump structure 51 are dummy via/metal structures 63. The dummy via/metal structures may include one or more metal layers 65 which may be discrete dummy metal segments, and one or more dummy vias 67. The dummy vias 67 and dummy via/metal structures 63 are inserted into the device at the points in the design sequence as described in conjunction with FIG. 2. Metal layers 65 are formed between dielectric layers such as between exemplary dielectric layers 69 and 71, through which vias 67 extend. The illustrated structures showing two layers of vias 67 interposed between three metal layers 65, is exemplary only and the dummy vias may extend through one or many associated dielectric layers and may be placed at any of various layers beneath bump structure 61 and may be arranged according to various arrangements such as those illustrated in FIGS. 3A, 3B.

Returning to FIG. 2, in addition to step 27 which represents data input to a computer system such as a CAD tool, steps 29, 31 and 33 represent tasks executed by the CAD design tool to execute the design of the semiconductor device, based on program instructions provided to the CAD unit. The program instructions may be sent to the computer system and stored on a memory device within the computer. The program instructions may be stored on a computer-readable medium, according to the invention.

Step 29 represents the execution of floorplanning in the design of the semiconductor device as well as bump cell placement including placement of conventional bump cells and the insertion of dummy metal and/or dummy vias in other bump cells and placement of these other bump cells. According to one exemplary embodiment, at step 31, placement and routing of interconnected active components and other device features takes place. The sequence of steps as indicated by the arrows indicates that bump cell placement including insertion of dummy vias and/or metal, takes place at step 29 prior to placement and routing of the interconnected active components. The insertion of dummy vias and dummy metals into the design thus takes place at step 29 prior to placement and routing of the interconnected active components at step 31. It can be further seen that floorplanning is executed along with bump cell placement, including dummy via insertion, in the illustrated exemplary embodiment. At step 33, the task of bump cell routing is executed. According to another exemplary embodiment, not illustrated, the execution of bump cell routing may take place along with the placement and routing of interconnected active components such as at step 31. After the aforementioned design steps are executed by the computer system, the result is a generation of lithography data at step 35. The lithography data may be input to a mask manufacturing tool to form a set of masks used to produce the semiconductor device.

Figure 5:
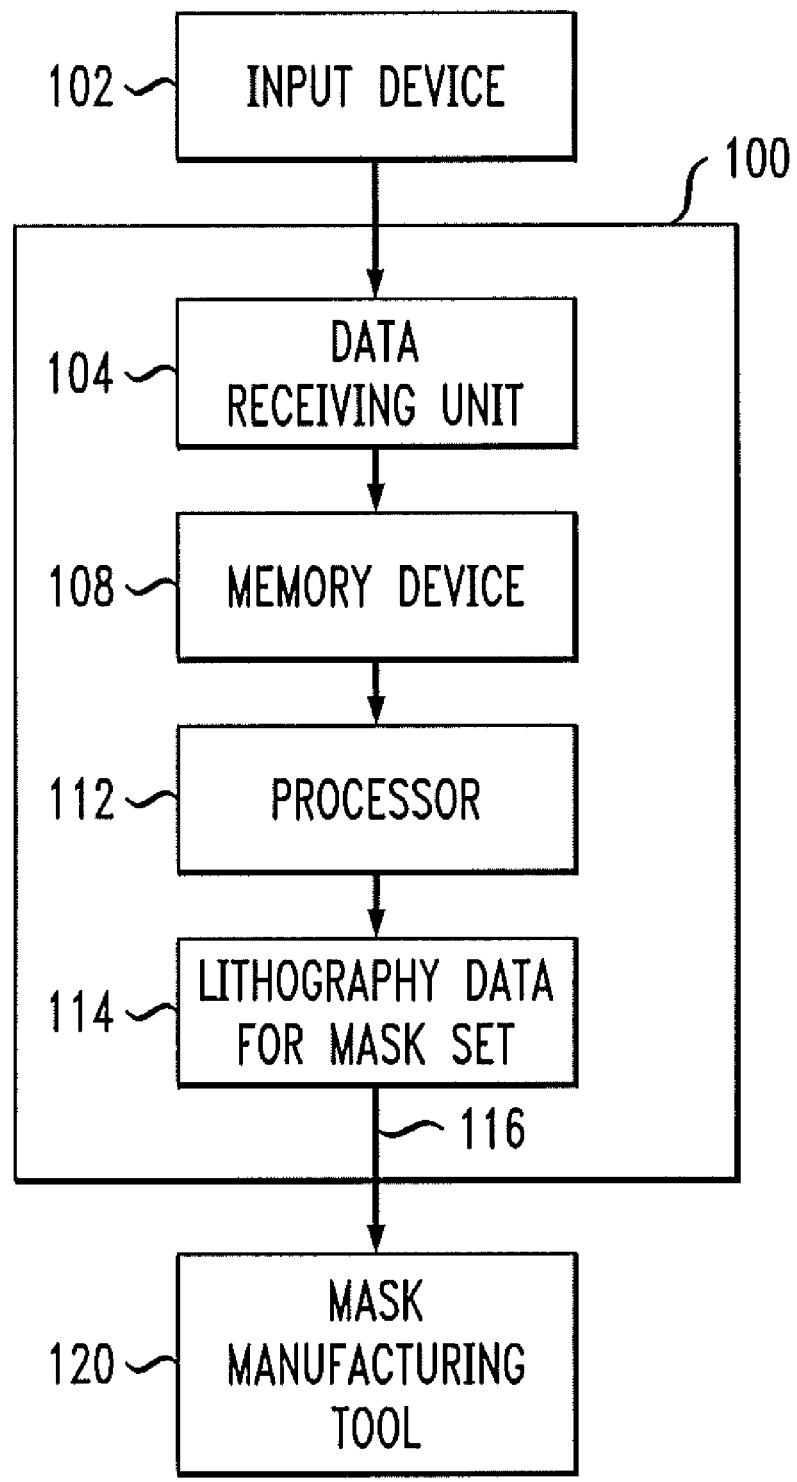
FIG. 5 is a schematic block diagram/flow chart of an exemplary computer system that may be used to carry out the invention.

FIG. 5 is a schematic flowchart and block diagram showing computer system 100 which may advantageously be any of various suitable CAD systems. Input device 102 is used to input data and information to computer system 100 and may be used to input design information and a netlist such as a gate level netlist. Floorplan information for the integrated circuit device as well as information on bump cells that includes information on dummy vias and/or dummy metal disposed within the bump cells, may be input and received by data receiving unit 104. Memory device 108 may store the aforementioned design information. Memory device 108 may also include program instructions for carrying out the design of a semiconductor device by executing a number of design steps such as placement and routing of bump cells and insertion of dummy vias as described in conjunction with FIG. 2. The program instructions may include instructions for bump cell placement with inserted dummy vias no later than the placement and the routing of interconnected components of the integrated circuit device, as discussed supra. The program instructions may have also been provided via input device 102. The execution of the computer-aided design may be carried out by processing unit 112 and the design data may be provided to lithography data unit 114 which receives lithography data sent by processing unit 112 and generates data on a mask list 116 that may be sent to a mask manufacturing tool 120 which is configured to assemble a mask set for the fabrication of a semiconductor device based on the mask list data received.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as lower, upper, horizontal, vertical, above, below, up, down, top and bottom as well as derivatives thereof (e.g., horizontally, downwardly, upwardly, etc.) should be construed to refer to the orientation as then described or as shown in the drawing under discussion. These relative terms are for convenience of description and do not require that the apparatus be constructed or operated in a particular orientation. Terms concerning attachments, coupling and the like, such as connected and interconnected, refer to a relationship wherein structures are secured or attached to one another either directly or indirectly through intervening structures, as well as both movable or rigid attachments or relationships, unless expressly described otherwise.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A computer implemented method for semiconductor device mask manufacturing, the method comprising:
   providing a mask manufacturing unit comprising a CAD unit configured to design mask patterns based on design data and to generate lithography data for a mask set used to produce a semiconductor device;
   providing a) design information on interconnected components of said semiconductor device in a netlist and b) design information on bump cells that includes information on inserting dummy vias within at least some of said bump cells, to said CAD unit;
   after said providing, directing said CAD unit to perform floorplanning, placement and routing of said interconnected components, and placement and routing of said bump cells based on said design information on bump cells; and
   said CAD unit executing at least said floorplanning; said placement and routing of said bump cells including insertion of said dummy vias; and said placement and routing of said interconnected components of said device,
   wherein at least said placement of said bump cells and said insertion of said dummy vias, is executed prior to said routing of said interconnected components of said device, and said dummy vias are disposed underneath UBM (under bump metallization) of at least one of said bump cells.

2. The method of claim 1, wherein said placement of said bump cells including said insertion of said dummy vias, is further executed prior to said placement of said interconnected components of said device.

3. The method of claim 1, wherein said placement of said bump cells including said insertion of said dummy vias, is executed along with said execution of said floorplanning.

4. The method of claim 1, wherein said design netlist comprises a gate level design netlist.

5. The method of claim 1, wherein said netlist further comprises further bump cells without dummy vias therein.

6. The method of claim 1, wherein said CAD unit executing comprises generating first lithography data for a first mask set, providing said first lithography data to a mask manufacturing tool and said mask manufacturing tool manufacturing said first mask set.

7. The method of claim 1, wherein a plurality of said dummy vias is inserted at multiple device levels underneath said UBM (under bump metallization) of at least one of said bump cells.

8. The method of claim 1, wherein each said dummy via extends vertically between dummy metal patterns.

9. A computer implemented method for semiconductor device mask manufacturing, the method comprising:
   providing a mask manufacturing unit comprising a CAD unit configured to design mask patterns based on design data and to generate lithography data for a mask set used to produce a semiconductor device;

providing a) design information on interconnected components of said semiconductor device in a netlist and b) design information on bump cells that includes information on inserting dummy vias within at least some of said bump cells, to said CAD unit;

after said providing, directing said CAD unit to perform floorplanning, placement and routing of said interconnected components, and placement and routing of said bump cells based on said design information on bump cells; and said CAD unit executing at least said floorplanning; said placement and routing of said bump cells including insertion of said dummy vias; and said placement and routing of said interconnected components of said device, wherein at least said placement of said bump cells and said insertion of said dummy vias, is executed prior to said routing of said interconnected components of said device, and said dummy vias comprise a uniform array of said dummy vias beneath UBM (under bump metallization) in at least one of said bump cells.

10. The method of claim 1, wherein said dummy vias comprise a staggered array of said dummy vias beneath said UBM (under bump metallization) in at least one of said bump cells.

11. The method of claim 1, wherein said dummy vias comprise an array of via structures underneath said UBM (under bump metallization) in at least one of said bump cells, each said via structure including an array of said dummy vias and dummy metal patterns.

12. A comp ter implemented method for semiconductor device mask manufacturing, said method comprising:

providing a mask manufacturing unit comprising a CAD unit configured to design mask patterns based on design data and generate lithography data for a mask set used to produce an integrated circuit (ic) device;

providing a) design information on interconnected active ic components in a netlist and b) design information on bump cells that includes information on inserting dummy vias within at least some of said bump cells, to said CAD unit; and directing said CAD unit to execute placement of said bump cells and insertion of said dummy vias into said bump cells along with execution of floorplanning of said semiconductor device, and to execute routing of said bump cells along with execution of placement and routing of said interconnected ic components, wherein said insertion of said dummy vias comprises inserting a staggered array of via structures, each said via structure comprising an array of vias and said via structures disposed at multiple levels of said ic device.

13. The method of claim 12, further comprising:

said CAD unit generating first lithography data for a first mask set; sending said first lithography data to a mask manufacturing tool; and said mask manufacturing tool manufacturing said first mask set.

14. The method of claim 12, further comprising insertion of dummy metal portions within at least some bump cells along with said insertion of said dummy vias.

15. A computer system adapted to design a mask set for an integrated circuit device, comprising a memory device and program instructions stored on said memory device for executing placement of bump cells and insertion of dummy vias into said bump cells no later than routing of interconnected active components of said integrated circuit device, said dummy vias disposed underneath UBM (under bump metallization) of at least one of said bump cells.

16. The computer system of claim 15, wherein said program instructions further include instructions to execute said placement of said bump cells and said insertion of said dummy vias into said bump cells no later than said floorplanning, and no later than placement, of said interconnected components of said device.

17. The computer system of claim 15, further comprising a data receiving unit configured to receive a gate level design netlist comprising design information on said interconnected components of said integrated circuit device, floorplan design information for said integrated circuit device and design information on said bump cells that includes information for said insertion of said dummy vias.

18. The computer system of claim 15, further comprising program instructions for routing of said bump cells, placement of said interconnected components of said integrated circuit device and floorplanning of said integrated circuit device and wherein said program instructions cause said computer system to produce lithography data and further comprising a lithography data unit configured to receive said lithography data and to generate data for manufacturing mask set, therefrom.

19. The computer system as in claim 15 further comprising processor that executes said program instructions based on design information input to said computer system.

20. A non-transitory computer readable storage medium encoded with a computer program to be executed by a computer for designing an integrated circuit device, said non-transitory computer readable storage medium comprising program instructions for carrying out execution of floorplanning, bump cell placement and routing, insertion of metal in said bump cells insertion of dummy vias underneath UBM (under bump metallization) in at least one of said bump cells, and placement and muting of interconnected active components of said integrated circuit device, wherein said program instructions provide for executing said bump cell placement and said insertion of dummy vias in said bump cells no later than said routing of interconnected active components of said integrated circuit device.

21. The non-transitory computer readable storage medium as in claim 20, wherein said program instructions further provide instructions to execute said bump cell lacement and said insertion of dummy vias in said bump cell not later than said floorplanning.

22. The non-transitory computer readable storage medium as in claim 20, wherein said program instructions further provide instructions to execute said bump cell placement and said insertion of dummy vias in said bump cells not later than said placement of said interconnected active components of said integrated circuit device.

23. The non-transitory computer readable storage medium as in claim 20, wherein said program instructions further provide instructions to execute said bump cell routing after said routing of interconnected active components of said integrated circuit device.

* * * * *

UNITED STATES PATENT AND TRADEMARK OFFICE
CERTIFICATE OF CORRECTION

PATENT NO. : 8,239,802 B2
APPLICATION NO. : 12/575147
DATED : August 7, 2012
INVENTOR(S) : Hung-Yi Lin et al.

It is certified that error appears in the above-identified patent and that said Letters Patent is hereby corrected as shown below:

Column 2, Line 47, delete "is" and insert -- ic --.

In the Claims:

Claim 12, Column 9, Line 31, delete "comp" and "ter" and insert -- computer --.

Claim 16, Column 10, Line 10, delete the "," after "placement".

Claim 20, Column 10, Line 39, delete "muting" and insert -- routing --.

Claim 21, Column 10, Line 47, delete "lacement" and insert -- placement --.

Claim 21, Column 10, Line 48, delete "cell" and insert -- cells --.

Signed and Sealed this
Nineteenth Day of March, 2013

Teresa Stanek Rea
*Acting Director of the United States Patent and Trademark Office*